United States Patent [19]

Lakshmanan et al.

[11] Patent Number: 4,857,594

[45] Date of Patent: Aug. 15, 1989

[54] MELT ADHESIVE COMPOSITIONS

[75] Inventors: Pallavoor R. Lakshmanan; Son T. Nguyen, both of Houston, Tex.

[73] Assignee: Baychem International, Inc.

[21] Appl. No.: 187,546

[22] Filed: Apr. 28, 1988

[51] Int. Cl.[4] .................. C08L 53/02; C08L 23/10
[52] U.S. Cl. ..................... 525/98; 524/477; 524/478; 524/505; 524/487; 524/488; 524/490; 525/210
[58] Field of Search ........................... 525/98

[56] References Cited

U.S. PATENT DOCUMENTS

| | | | |
|---|---|---|---|
| 3,686,107 | 8/1972 | Russell | 525/98 |
| 3,850,858 | 11/1974 | Park | 525/98 |
| 3,862,068 | 1/1975 | Russell | 525/98 |
| 3,935,338 | 1/1976 | Robertson et al. | 428/40 |
| 3,993,613 | 11/1976 | Doss et al. | 525/98 |
| 4,286,077 | 8/1981 | St Clair et al. | 525/98 |
| 4,460,364 | 7/1984 | Chen | 524/505 |
| 4,554,304 | 11/1985 | Hansen et al. | 524/488 |
| 4,714,749 | 12/1987 | Hughes et al. | 525/98 |

FOREIGN PATENT DOCUMENTS

86/07079  5/1986  Japan ..................... 525/98

*Primary Examiner*—Carman J. Seccuro
*Attorney, Agent, or Firm*—Joseph J. Carducci

[57] ABSTRACT

A melt adhesive composition containing an amorphous polypropylene, a selectively hydrogenated monoalkenyl arene/conjugated diene block copolymer and a tackifier.

18 Claims, No Drawings

MELT ADHESIVE COMPOSITIONS

BACKGROUND OF THE INVENTION
1. Field of the Invention

This invention relates to melt adhesive compositions especially useful in adhering polyolefin bodies to themselves, to other polyolefin bodies and to other non-polyolefinic bodies comprising a blend of (1) an amorphous polypropylene (amorphous polyalphaolefins), (2) a selectively hydrogenated monoalkenyl arene/conjugated diene block copolymer of linear or radial configuration and (3) a tackifier.

2. Description of the Prior Art

The preparation of adhesives containing amorphous polypropylene and block copolymers containing unsaturated mid block copolymers, for example, polystyrene-polybutadiene-polystyrene (S-B-S) or polystyrene-polyisoprene-polystyrene (S-I-S), tackifier and a rubber-extending oil is known, as evidenced, for example, in U.S. Pat. No. 3,862,068 to Russell. Such adhesives have limited elevated temperature melt stability, limited resistance to $O_2$ and UV, but, most important, exhibit limited performance characteristics on untreated polyolefin surfaces wherein high bond integrity and durability are also required. U.S. Pat. No. 3,686,107 to Russsell also discloses similar compositions having similarly undesired characteristics noted above. St. Clair et al in U.S. Pat. No. 4,296,008 prepares a sealant composition containing a selectively hydrogenated S-B-S and S-I-S block copolymer in combination with tackifying resins, plasticizers and solvents. U.S. Pat. No. 4,138,378 to Doss also discloses a sealant formulation containing selectively hydrogenated block copolymers, a polyalkene plasticizer, a tackifying resin and a filler. St. Clair et al in U.S. Pat. No. 4,286,077 disclose the use of selectively hydrogenated block copolymers in combination with a tackifier and a plasticizer to obtain a pressure sensitive adhesive. Additional variants in adhesive preparations involving the use of hydrogenated block copolymers are described in U.S. Pat. No. 4,151,057 to St. Clair et al.

The patents discussed above are exemplary of the prior art involving the utilization of various types of block copolymers in the preparation of adhesives and sealants. Obviously, none of these references discloses the use of an amorphous polypropylene in combination with selectively hydrogenated monoalkenyl arene/conjugated diene block copolymers and tackifiers. We have discovered that such combinations containing an amorphous polypropylene exhibit excellent adhesivity to untreated polyolefins and are useful in various plastic fabrication and assemblies involving such surfaces.

SUMMARY OF THE INVENTION

We have found that when a selectively hydrogenated monoalkenyl arene/conjugated diene block copolymer, such as a selectively hydrogenated styrene-butadiene-styrene or styrene-isoprene-styrene copolymer, is combined with an amorphous polypropylene and a tackifier, the resultant adhesive exhibits an unexpected and superior adhesivity to polyolefin surfaces, such as polyethylene and polypropylene. These adhesives have a special utility in the fabrication of a variety of articles, for example, in the preparation of packaging films, closures of wax-coated paper or paperboard boxes, assembly of injection molded objects and containers, some or all of which will require the necessity for an adhesive use to provide the desired fabricated products for various articles of commerce. Thus, it is absolutely necessary that the adhesive used exhibit excellent adhesivity to such surfaces to hold the assemblies together through their lifetime of use. Our present adhesives, moreover, have an excellent affinity to untreated polyolefin surfaces. It is well known in the art that polyolefins can be rendered adhesive receptive only after appropriate surface treatment is employed, such as via the use of corona discharge, flame or via plasma. Such approach will obviously require an additional step to impart surface bondability to polyolefins, and, hence, any approach to the design of an adhesive which will overcome this additional, and costly, step, that is, exhibit a direct affinity to untreated polyolefin surfaces, will be of much interest and useful to industry.

The amorphous (atactic) polypropylenes, including amorphous polyalphaolefins, and combinations thereof, used herein to prepare the novel melt adhesive compositions claimed herein will show varying extent of solubility in hydrocarbon solvents, such as pentane, hexane, etc., have a crystallinity of less than about 10 weight per cent, preferably less than about five weight percent and possess a molecular weight in the range of about 300 to about 50,000, preferably about 1000 to about 25,000. The method used in preparing the amorphous polypropylene or amorphous polyalphaolefins and recovering the same, has no effect on its utilization in the preparation of the novel melt adhesive claimed herein. Thus, amorphous polypropylene formed as a byproduct in minor amounts during the production of crystalline polypropylene (homo or copolymer resins) by the polymerization of propylene in the presence of stereospecific catalysts by processes disclosed, for example, in U.S. Pat. Nos. 3,679,775 to Hagemeyer et al, 3,529,037 also to Hagemeyer et al and 3,900,694 to Jurrens can be used. On the other hand amorphous polypropylene (amorphous polyalphaolefins) produced directly, that is, by intent, without the production of crystalline copolymers of propylene and lower olefins, as disclosed, for example, in U.S. Pat. Nos. 3,923,758 to Carter at el, 3,954,697 to McConnell et al, 4,072,812 to McConnell et al, 4,072,813 to McConnell et al, 4,259,470 to Trotter et al, 4,309,522 to Dietrich et al and 4,317,897 to Herrmann et al can also be used. While the amorphous polypropylenes (amorphous polyalphaolefins) used herein can be homopolymers of propylene, it is within the purview of our invention to use substantially amorphous products based on propylene copolymerized with olefins, such as ethylene, butene, pentene, hexene, nonene, decene, etc., whether such products have been obtained intentionally or as by-products. The latter copolymers are defined herein as "amorphous polyalphaolefins". In the claimed invention herein, the term "amorphous polypropylene" is intended to include the said "amorphous polyalphaolefins". Such amorphous copolymers can have a melt viscosity in the range of about 200 to about 50,000, or even higher, cps at 375° F. (190.5° C.) (ASTM D 3236). These copolymers will contain propylene in an amount ranging from about 25 to about 99.5, or even higher, weight percent, generally from about 50 to about 99.5, or even higher, weight percent, with the remainder being one or more of the other olefins identified above. The amorphous polyalphaolefins useful herein are further described, for example, in U.S. Pat. Nos. 4,022,728 to Trotter et al, 4,120,916 to Meyer et al, 4,210,570 to Trotter et al, 4,264,756 to Trotter et al and 4,288,358 to Trotter et al.

The block copolymer used herein to prepare the novel melt adhesive composition claimed herein can be either a multiblock copolymer containing the structure A—B, the structure A—B—A$_1$ or the radial structure (A—B)$_x$Y, or combinations thereof, wherein A and A$_1$, the same or different, are alkenyl arene polymer blocks, preferably monoalkenyl arene polymer blocks, B is a block containing a hydrogenated conjugated diene polymer, preferably a block consisting essentially of a hydrogenated conjugated diene polymer, Y represents a residue of a polyfunctional coupling agent or a polyfunctional initiator and x is a number having a value greater than 2, preferably from 3 to 4. The geometrical structure of the block copolymers used herein is not critical, as long as the A, A$_1$ and B components thereof fall within the above definition, and therefore the structure can be either linear (including tapered), radial or branched. Each of the blocks A, A$_1$ and B can be substantially homopolymer or random copolymer blocks, as long as at least about 50 weight percent, preferably at least about 75 weight percent of each block predominates in at least one class of the monomers characterizing the blocks and the A and A$_1$ blocks individually predominate in alkenyl arenes and Block B individually predominates in a hydrogenated conjugated diene.

The term "alkenyl arene" can be any alkenyl arene having from 8 to 18 carbon atoms, preferably from 8 to 9 carbon atoms, and can include styrene itself and its analogs and homologs, for example, alpha methyl styrene and ring-substituted styrene, such as, ring alkylated styrenes, for example, 3-methyl styrene, 4-methyl styrene, 4-n-propyl styrene, and other alkenyl arenes, such as 1-vinyl naphthalene, 2-vinyl naphthalene and the like. Styrene and alpha methyl styrene are preferred, with styrene being especially preferred.

The term "conjugated diene" is intended to include a conjugated diene having from 4 to 8 carbon atoms, preferably from 4 to 6 carbon atoms, such as 1,3-butadiene, isoprene, 1,3-pentadiene, 2,4-hexadiene, 3-ethyl-1,3-pentadiene and the like and copolymers of such conjugated dienes, provided that such copolymer is characterized by such conjugated diene and such copolymer contains at least about 50 weight percent, preferably at least about 75 weight percent, of such conjugated diene. When the block copolymers defined above, A—B—A$_1$, A—B or (A—B)$_x$Y, are selectively hydrogenated, for example following the procedure defined in U.S. Pat. Nos. 3,595,942 to Wald et al and 3,696,088 to DeVault, blocks A and A$_1$ are substantially unaffected by the hydrogenation but at least about 75 weight percent, generally all, of the conjugated diene polymer in block B is converted to the corresponding hydrogenated species. Thus, when block B is composed of polybutadiene the resulting block is, or at least appears to be, a copolymer of ethylene and butene-1 (EB). When block B is composed of isoprene, the resulting block is, or at least appears to be, a copolymer of ethylene and propylene (EP).

Typical block copolymers that can be used include the following:

(1) polystyrene-hydrogenated polybutadiene-polystyrene,
(2) polystyrene-hydrogenated polyisoprene-polystyrene,
(3) poly(alphamethyl) styrene-hydrogenated
(4) poly(alphamethyl) styrene-hydrogenated
(5) polystyrene-hydrogenated polybutadiene,
(6) polystyrene-hydrogenated polyisoprene,
(7) poly(alphamethyl) styrene-hydrogenated polybutadiene,
(8) poly(alphamethyl) styrene-hydrogenated polyisoprene,
(9) polymers of the configuration (A—B)$_x$Y, wherein A segments, B represents a hydrogenated polybutadiene or polyisoprene segment, Y represents a residue of a polyfunctional coupling agent or a polyfunctional initiator and x is a number having a value greater than 2, preferably from 3 to 4,
(10) combinations of the above in various proportions, etc.

The average molecular weight of the individual polymer blocks A, A$_1$ and B can vary over a wide range. The total average molecular weight of the alkenyl arene blocks can be in the range of about 2000 to about 125,000, but preferably will be in the range of about 5,000 to about 50,000. The selectively hydrogenated conjugated diene polymer block will have an average molecular weight in the range of about 10,000 to about 500,000 but preferably will be in the range of about 20,000 to about 300,000. The block copolymers used herein will contain a total from about five to about 50 weight percent of the alkenyl arene block(s), preferably from about 10 to about 35 weight percent.

Examples of the block copolymers that can be used herein are further defined in U.S. Pat. Nos. 4,151,057, 4,286,077 and 4,296,008 to St. Clair et al, and in U.S. Pat. No. 4,138,378 to Doss discussed hereinabove.

The third necessary component in preparing the novel melt adhesive compositions claimed herein is a hydrocarbon tackifier. Suitable for such use can be any hydrocarbon tackifier, or combinations thereof, generally used, or suitable for use, in the preparation of hot melt adhesives. A particularly suitable tackifier can be obtained from commercially available hydrocarbon resins resulting from the polymerization of monomers consisting of olefins, cycloolefins and diolefins, for example, residual byproduct monomers resulting from the manufacture of isoprene. Such tackifiers are described, for example, in U.S. Pat. Nos. 3,932,330 to Lakshmanan, 4,022,728 to Trotter et al and 4,072,735 to Ardemagni. Such petroleum-derived hydrocarbon resins are sometimes also referred to as synthetic terpene resins. Other types of tackifiers also suitable for use herein include products obtained from cyclopentadiene and dicyclopentadiene polymerization and subsequent hydrogenation, conventional terpene resins and modified terpene resins obtained as a result of the polymerization of such terpene-derived monomers, such as alpha- and beta-pinene, dipentene and limonene, rosin and rosin esters, hydrogenated rosin products and disproportionated rosin products. Petroleum hydrocarbon resins that have been post hydrogenated to yield a more thermally stable resin are especially preferred. The tackifiers used to prepare the novel melt adhesive compositions claimed herein will typically exhibit a ring and ball softening point (ASTM E 28) in the range of about 10° to about 150° C., preferably about 25° to about 125° C.

The three components required to obtain the novel melt adhesives claimed herein can be present in the amounts defined below in Table I.

TABLE I

| | | Weight Percent | |
|---|---|---|---|
| | | Broad Range | Preferred Range |
| (1) | Amorphous Polypropylene | 5-95 | 30-90 |

TABLE I-continued

|   |   | Weight Percent | |
|---|---|---|---|
|   |   | Broad Range | Preferred Range |
| (2) | Selectively Hydrogenated Block Copolymer | 2.5–40 | 5–20 |
| (3) | Hydrocarbon Tackifier | 2.5–55 | 5–50 |

In an embodiment herein our melt adhesives can have also incorporated therein isotactic polypropylene, ethylene-propylene copolymers, homo and copolymers from butene-1, paraffin and microcrystalline waxes, Fischer-Tropsch waxes, low molecular weight polybutenes, polyisobutylene, low molecular weight (700 to 25,000) polyethylene, conventional low density polyethylene, process oils, etc., in an amount upto about 40 weight percent, generally upto about 25 weight percent, based on the final adhesive composition.

Since hot melt adhesives tend to experience varying degrees of thermal exposure during thermal processing and/or during application to the substrate, it is desirable to incorporate therein one or more antioxidants in small amounts to inhibit thermal and/or thermooxidative degradation. Several types of commercial products, predominantly of the hindered phenol types, are available for this purpose to function as primary antioxidants. A secondary antioxidant belonging to the general classification of thioesters and phosphites can also be used in combination with the hindered phenols. Exemplary of antioxidants suitable for use herein include tetrakis[methylene 3-(3',5'-di-t-butyl-4-hydroxyphenyl) propionate] methane; 2,2'-ethyldenebis(4,6-di-tertiary-butylphenol); 1,1-3-tris(2-methyl-4-hydroxy-5-t-butyl phenyl) butane; and 1,3,5-trimethyl-2,4,6-tris(3,5-tertiary-butyl-4-hydroxybenzy l) benzene. Secondary antioxidants, such as dilaurylthiodipropionate; pentaerythritol tetrakis(beta-laurylthiopropionate) and various alkyl-, aryl-, di- and polyphosphites and thiophosphites can also be employed in combination with appropriate hindered phenols. Effective amounts of antioxidants that can be used can range from about 0.05 to about five weight percent, preferably from about 0.1 to about 2.5 weight percent, based on the weight of the final adhesive composition.

The preparation of the novel melt adhesive claimed herein is not critical and any suitable method can be employed. In a preferred embodiment a mixing vessel is heated to an elevated temperature, for example in the range of about 350° to about 400° F. (162.8° to 204.5° C.) and the amorphous polypropylene, tackifier and the antioxidant, if used, are added thereto. The resulting mixture is allowed to soften under slow mixing to homogeniety. At this juncture the block copolymer is added in small quantities to the melt with continued mixing until the entire amount is added. Following this mixing is further continued with homogeniety of the entire adhesive mass occurs. After this the product is collected in a release line tray. The total mixing time is generally in the range of about two to about four hours.

DESCRIPTION OF PREFERRED EMBODIMENTS

The present invention relating to the novel hot melt adhesives claimed herein can further be illustrated by the following. A number of compositions were prepared either using an oil-heated Brabender mixing vessel having a compounding bowl with a capacity of 450 millimeters or using a stainless steel beaker heated with a GLAS-COL mantle with a capacity of 500 milliliters. Before beginning, the Brabender mixing vessel was heated to a temperature ranging from 350° F. (176.7° C.) to 380° F. (193.3° C.). The amorphous polypropylene, tackifier and antioxidant were allowed to soften and were mixed at such temperature under slow mixing for 30 minutes. When the preparation was carried out in a stainless steel beaker, sufficient amount of the amorphous polypropylene and tackifier, along with sufficient antioxidant, were placed in the container and the entire mass was slowly heated to the desired temperature. At the point of fluidity of the melt, slow stirring commenced to bring the mass to homogeneity. In both mixing approaches following homogenization, the block copolymer was slowly added in small quantaties under continuous mixing until the desired homogeneity of the mixture was obtained. Total mixing time ranged from about two to about four hours. The mixed compositions were then collected on a release line tray.

The thermal stabilities of the adhesive compositions that were prepared were determined by exposing 8 to 10 grams quantities of a sample in a five-inch x one-inch test tube to a temperature environment of 350° F. (176.7° C.) for 24 hours. At the end of the 24 hours, the composition was visually observed for any separation stratification and loss in composition homogeneity. The ring and ball softening points of the compositions were determined according to ASTM Procedure E-28. The melt viscosities of the compositions were determined according to ASTM Procedure D 3236. The Peel Adhesion Failure Temperature (PAFT) and Shear Adhesion Failure Temperature (SAFT) were performed according to TAPPI Procedure T814-77; and the peel strength values were determined according to ASTM Procedure D 1876.

A Slautterback "minisquirt" hot melt gun applicator was used to prepare the peel strength, 180° reverse peel strength, PAFT and SAFT specimens to test the hot melt adhesive compositions of this invention. To determine peel strength values of these compositions, polyethylene laminated test specimens were prepared by applying the molten hot melt adhesive compositions at 350° F. (176.7° C.) to a 4-mil (one-inch by six-inch) high density polyethylene film as a continuous strip one inch wide along the film of 2½-inch length, and then another 4-mil high density polyethylene film of the same dimensions was placed on top of the film carrying the strip of the hot melt adhesive composition. Enough contact pressure was applied via a rubber roller to spread the adhesive and to bring the adhesive in intimate contact with the surfaces. The laminates were then aged for a minimum of 24 hours prior to testing. Three specimens for each composition were prepared and the bond strength was measured by peeling at the glue line by means of a J. J. Lloyd Tensile Tester at a peel rate of 50 millimeters per minute. The maximum force in grams necessary to cause rupture of the bond was noted. The average of the three such determinations was recorded.

To obtain the 180 degrees reverse peel strength values, three-mil Mylar film/180-mil high density polyethylene and three-mil Mylar film/120-mil polypropylene laminated test specimens were prepared by applying the molten hot melt adhesive composition at 350° F. (176.7C) to either 180 mil (one-inch by six-inch) high density polyethylene substrate or 120 mil (one-inch by six-inch) polypropylene substrate as a continuous strip one-inch wide along the substrate length and then a 3-mil (one-inch by 12-inch) strip of Mylar film was placed on top of the substrate carrying the strip of the hot melt adhesive composition. Three assemblies of each were prepared for each adhesive valuation. Following this procedure enough contact pressure was applied via a rubber roller to spread the adhesive evenly and to bring the adhesive in intimate contact with each of the surfaces. The laminates were then aged for 24 hours prior to testing. Testing procedures were the same as for the polyethylene specimens.

To determine Peel Adhesion Failure Temperature (PAFT) and Shear Adhesion Failure Temperature (SAFT) values of the hot melt adhesive compositions, 78 pound (one-inch by six-inch) kraft laminated test paper was used by applying each of the compositions to the kraft strip by means of a Slautterback "minisquirt" hot melt applicator. The hot melt adhesive compositions were applied at 350° F. (176.7° C.) to the kraft paper as a continuous coating of one-inch by 2½-inch area of the kraft substrate for PAFT performance and of one-inch by one-inch areas of the kraft substrates for SAFT performance. Then another 78 pound kraft paper strip of the same dimension was placed on top or positioned longitudinally on a kraft paper carrying the coating of the hot melt adhesive compositions. Sufficient contact pressure was then applied to bring the adhesive into intimate contact with the surfaces. The laminates were then aged for 24 hours prior to testing. Two or three specimens for each composition were prepared. The test was carried out by exposing the assemblies in an oven conditioned at 100° F. (37.8° C.). The specimens were suspended at one end in the oven to a suitable device (a paper clip), while to the other end either a 100-gram load (PAFT test), or a 500-gram load (SAFT test) were attached. From this point on, the temperature of the oven was increased programmatically at the rate of 10° F. (5.5° C.) every 15 minutes until the failure temperature was reached. The average failure temperature was then recorded.

The components used in the preparation of the adhesive compositions are identified below in Table II.

TABLE II

List Of Raw Materials

| | Supplier | Trade Name | Characteristics |
|---|---|---|---|
| Polymer | | | |
| S-B-S Block Copolymer | Shell Chemical | Kraton D-1102 | 28% Styrene; 70,000 M.W. |
| S-I-S Block Copolymer | Shell Chemical | Kraton D-1107 | 15% Styrene; 140,000 M.W. |
| S-EB-S Block Copolymer | Shell Chemical | Kraton G-1650 | 29% Styrene; 70,000 M.W. |
| S-EB-S Block Copolymer | Shell Chemical | Kraton G-1652 | 30% Styrene; 49,000 M.W. |
| S-EB-S/ S-EB Block Copolymer | Shell Chemical | Kraton GX-1657 | 13% Styrene; 80,000 M.W. |
| S-EB-S/ S-EB Block Copolymer | Shell Chemical | Kraton GX-1726 | 30% Styrene; 49,000 M.W. |
| S-EP Block Copolymer | Shell Chemical | Kraton G-1701 | 37% Styrene; 95,000 M.W. |
| Tackifier | | | |
| Petroleum Hydrocarbon Resin | Goodyear Chemicals | Wingtac 10 | Ring & Ball Soft. Pt. 10° C. |
| Petroleum Hydrocarbon Resin | Exxon Chemicals | Escorez 5300 | Ring & Ball Soft. Pt. 105° C. |
| Hydrogenated Cyclopentadiene | Exxon Chemicals | Escorez 5380 | Ring & Ball Soft. Pt. 85° C. |
| Petroleum Hydrocarbon Resin | Hercules Inc. | Piccotac 95 | Ring & Ball Soft. Pt. 95° C. |
| Poly (alpha)terpene Resin | Hercules Inc. | Piccolyte A 115 | Ring & Ball Soft. Pt. 115° C. |
| Poly(beta)terpene Resin | Hercules Inc. | Piccolyte S 115 | Ring & Ball Soft. Pt. 115° C. |
| Poly(beta)terpene Resin | Hercules Inc. | Piccolyte S 10 | Ring & Ball Soft. Pt. 10° C. |
| Hydrogenated Rosin | Hercules Inc. | Foral AX | Ring & Ball Soft. Pt. 75° C. |
| Hydrogenated Rosin Ester | Hercules Inc. | Foral 85 | Ring & Ball Soft. Pt. 85° C. |
| Hydrogenated Hydrocarbon Resin | Hercules Inc. | Regalrez 1094 | Ring & Ball Soft. Pt. 94° C. |
| Hydrogenated Aromatic Resin | Hercules Inc. | Regalite 7070 | Ring & Ball Soft. Pt. 71° C. |
| Wax | | | |
| Paraffin Wax | Shell Chemical | Shellwax 700 | Melt Point 183° F. (83.88° C.) |
| Amorphous Polypropylene & Amorphous Polyalphaolefin | | | |
| Amorphous Polypropylene | Baychem | K-TAC 100 | Viscosity @ 375° F. (190.5° C.), 250 cps |
| Amorphous Polypropylene | Baychem | K-TAC 100A | Viscosity @ 375° F. (190.5° C.), 850 cps |
| Amorphous Polypropylene | Baychem | K-TAC 100B | Viscosity @ 375° F. (190.5° C.), 1400 cps |
| Amorphous Polypropylene | Baychem | K-TAC 100D | Viscosity @ 375° F. (190.5° C.), 2800 cps |
| Amorphous Polypropylene | Baychem | K-TAC 400 | Viscosity @ 375° F. (190.5° C.), 10,000 cps |
| Amorphous Polypropylene | Eastman | Eastobond M-5C | Viscosity @ 375° F. (190.5° C.), 3650 cps |
| Amorphous Polypropylene | Eastman | Eastobond M-5H | Viscosity @ 375° F. (190.5° C.), 2000 cps |
| Amorphous Polyalphaolefin | El Paso Products Co | Rextac B3B15 | Viscosity @ 375° F. (190.5° C.), 1600 cps |
| Amorphous Polyalphaolefin | El Paso Products Co | Rextac B6B35 | Viscosity @ 375° F. (190.5° C.), 3950 cps |
| Amorphous Polyalphaolefin | Huls | Vestoplast 508 | Viscosity @ 375° F. (190.5° C.), 6800 cps |
| Amorphous Polyalphaolefin | Huls | Vestoplast 608 | Viscosity @ 375° F. (190.5° C.), 6200 cps |
| Amorphous Polyalphaolefin | Huls | Vestoplast 703 | Viscosity @ 375° F. (190° C.), 2500 cps |
| Amorphous Polyalphaolefin | Huls | Vestoplast V3643 | Viscosity @ 375° F. (190° C.), 6400 cps |
| Antioxidant | | | |
| Hindered Phenol | Schenectady Chemicals | Isonox 129 | Melt. Point. 162° C. |
| Dilauryl thiodipropionate (DLTDP) | Evans Chemetics | DLTDP | Melt. Point. 40° C. |

Data obtained in a series of runs are set forth below in Table III.

TABLE III

BASE RUNS

| | Run # | | | | | | | |
|---|---|---|---|---|---|---|---|---|
| | 1 | 2 | 3 | 4 | 5 | 6 | 7 | 8 |
| | PARTS BY WEIGHT, GRAMS | | | | | | | |
| APP, K-TAC 100B | 100.00 | 85.00 | 50.00 | 53.75 | 75.00 | — | — | 50.00 |
| Shellwax 700 | — | — | — | — | — | 47.50 | — | — |

TABLE III-continued

| | BASE RUNS | | | | | | | |
|---|---|---|---|---|---|---|---|---|
| | Run # | | | | | | | |
| | 1 | 2 | 3 | 4 | 5 | 6 | 7 | 8 |
| Kraton GX-1657 | — | 15.00 | 15.00 | 7.50 | 7.50 | 5.00 | 9.52 | — |
| Escorez 5380 | — | — | 35.00 | 38.75 | 17.50 | 47.50 | 90.48 | — |
| Wingtack 10 | — | — | — | — | — | — | — | 50.00 |
| Isonox 129/DLTDP (1:1) | 0.60 | 0.6 | 0.60 | 0.60 | 0.60 | 0.60 | 0.60 | 0.60 |
| Total | 100.6 | 100.6 | 100.6 | 100.6 | 100.6 | 100.6 | 100.6 | 100.6 |
| Properties | | | | | | | | |
| Viscosity, cps @ 350° F. | 2000 | 10500 | 9350 | 3300 | 4300 | 40 | 1400 | 275 |
| R & B, °C. | 154 | 156 | 139 | 149 | 152 | 89 | 93 | 142 |
| Performance | | | | | | | | |
| Peel Strength, g/in, 50 mm/min | | | | | | | | |
| HDPE (4 mil)/HDPE (4 mil) | 950 | 1045 | 4400 | 3180 | 1630 | No Adh | No Adh. | 330 |
| Mylar (3 mil)/PP (120 mil) | 1500 | 160 | 4090 | 6240 | 2880 | No Adh | No Adh. | 363 |

An inspection of the data in Table III shows that when amorphous polypropylene is used alone as an adhesive in Run No. 1 some level of adhesion is obtained to high density polyethylene (HDPE) and polypropylene (PP) surfaces. When amorphous polypropylene was combined solely with a selectively hydrogenated block copolymer composed of styrene and ethylene butylene polymer blocks (Kraton GX-1657) in Run No. 2, no appreciable improvement in adhesion to a HDPE surface was achieved and adhesion to polypropylene was significantly reduced. When the same selectively hydrogenated block copolymer was combined solely with a tackifier in Run No. 7 no adhesion at all was obtained. When in Run No. 8 amorphous polypropylene was combined solely with a tackifier, the results were inferior to Run No. 1. The use of Kraton GX-1657, a wax and a tackifier, but no amorphous polypropylene, in Run No. 6 resulted in a composition exhibiting no adhesivity. Note, however, that in Runs Nos. 3, 4 and 5, wherein an adhesive containing the selectively hydrogenated block copolymer Kraton GX-1657, amorphous polypropylene and a tackifier was tested, unexpected and dramatic improvements in adhesive performance was obtained in both HDPE and PP surfaces.

An additional series of runs was made and the data obtained are set forth below in Table IV.

TABLE IV

| | Effect of Component Levels On Blend Performance | | | | | |
|---|---|---|---|---|---|---|
| | Run # | | | | | |
| | 9 | 10 | 11 | 12 | 13 | 14 |
| | PARTS BY WEIGHT, GRAMS | | | | | |
| APP, K-TAC 100B | 40.00 | 60.10 | 73.00 | 20.00 | 45.00 | 47.50 |
| Kraton GX-1657 | 20.00 | 13.30 | 9.00 | 40.00 | 10.00 | 5.00 |
| Escorez 5380 | 40.00 | 26.60 | 18.00 | 40.00 | 45.00 | 47.50 |
| Isonox 129/DLTDP (1:1) | 0.60 | 0.60 | 0.60 | 0.60 | 0.60 | 0.60 |
| Total | 100.6 | 100.6 | 100.6 | 100.6 | 100.6 | 100.6 |
| Properties | | | | | | |
| Viscosity, cps @ 350° F. | 14500 | 7500 | 4950 | 85500 | 3650 | 1650 |
| R & B, °C. | 110 | 152 | 153 | 124 | 134 | 148 |
| Performance | | | | | | |
| Peel Strength, g/in., 50 mm/min. | | | | | | |
| HDPE (4 mil)/HDPE (4 mil) | 5790 | 3970 | 2180 | 2720 | 6200 | 6265 |
| Mylar (3 mil)/PP (120 mil) | 10430 | 4770 | 2970 | 3400 | 12260 | 9530 |

The data in Table IV clearly shows that a highly significant increase in adhesion to both HDPE and PP surfaces is obtained even though the amounts of amorphous polypropylene, selectively hydrogenated block copolymer and tackifier are varied over a wide range.

Still another series of runs was made and the data obtained are set forth below in Table V.

TABLE V

| | Effect Of Tackifier Type On Blend Performance | | | | | | | | | |
|---|---|---|---|---|---|---|---|---|---|---|
| | Run # | | | | | | | | | |
| | 15 | 16 | 17 | 18 | 19 | 20 | 21 | 22 | 23 | 24 |
| | PARTS BY WEIGHT, GRAMS | | | | | | | | | |
| APP, K-TAC 100B | 47.50 | 47.50 | 47.50 | 47.50 | 47.50 | 47.50 | 47.50 | 47.50 | 47.50 | 47.50 |
| Kraton GX-1657 | 5.00 | 5.00 | 5.00 | 5.00 | 5.00 | 5.00 | 5.00 | 5.00 | 5.00 | 5.00 |
| Piccotac 95 | 47.50 | — | — | — | — | — | — | — | — | — |
| Wingtac 10 | — | 47.50 | — | — | — | — | — | — | — | — |
| Piccolyte A 115 | — | — | 47.50 | — | — | — | — | — | — | — |
| Piccolyte S 115 | — | — | — | 47.50 | — | — | — | — | — | — |
| Piccolyte S 10 | — | — | — | — | 47.50 | — | — | — | — | — |
| Regalrez 1094 | — | — | — | — | — | 47.50 | — | — | — | — |
| Regalite 7070 | — | — | — | — | — | — | 47.50 | — | — | — |
| Foral AX | — | — | — | — | — | — | — | 47.50 | — | — |
| Foral 85 | — | — | — | — | — | — | — | — | 47.50 | — |
| Escorez 5300 | — | — | — | — | — | — | — | — | — | 47.50 |
| Isonox 129/DLTDP (1:1) | 0.60 | 0.60 | 0.60 | 0.60 | 0.60 | 0.60 | 0.60 | 0.60 | 0.60 | 0.60 |
| Total | 100.6 | 100.6 | 100.6 | 100.6 | 100.6 | 100.6 | 100.6 | 100.6 | 100.6 | 100.6 |

TABLE V-continued

| | Effect Of Tackifier Type On Blend Performance | | | | | | | | | |
|---|---|---|---|---|---|---|---|---|---|---|
| | Run # | | | | | | | | | |
| | 15 | 16 | 17 | 18 | 19 | 20 | 21 | 22 | 23 | 24 |
| Properties | | | | | | | | | | |
| Viscosity, cps @ 350° F. | 1500 | 650 | 1700 | 2000 | 850 | 1550 | 1350 | 1050 | 1250 | 2500 |
| R & B, °C. | 151 | 145 | 147 | 150 | 147 | 148 | 148 | 147 | 148 | 150 |
| Performance | | | | | | | | | | |
| Peel Strength, g/in., 50 mm/min. | | | | | | | | | | |
| HDPE (4 mil)/HDPE (4 mil) | 5450 | 910 | 5450 | 5450 | 1040 | 5450 | 5450 | 4448 | 5943 | 2450 |
| Mylar (3 mil)/PP (120 mil) | 12710 | 1090 | 13170 | 14070 | 1410 | 13170 | 10900 | 6844 | 9662 | 7630 |

As seen from Table V, the adhesion obtained in each of Runs 15, 17, 18 and 20 to 24 is still extremely high when the amorphous polypropylene and the block copolymer are combined with a variety of tackifiers. Although in Runs Nos. 16 and 19, the adhesivity to HDPE and PP surfaces was low, about the same order as obtained in Runs Nos. 1 and 2, it should be pointed out that Runs Nos. 16 and 19 should be compared, however, with Run No. 8 in showing that the presence of all three components, namely, amorphous polypropylene, the block copolymer and a tackifier, must be present to obtain an improved adhesivity. For example when approximately equal amounts of amorphous polypropylene and a low softening point tackifier alone were used in the preparation of the adhesive in Run No. 8, adhesivity to both HDPE and PP surfaces was extremely low. When, however, in Runs 16 and 19, a small amount of the Kraton GX-1657 selectively hydrogenated block copolymer was added to approximately equal amounts of amorphous polypropylene and a low softening point tackifier, significantly improved adhesion to both HDPE and PP was achieved in comparison to Run No. 8.

Yet another series of runs was made. The data obtained are set forth below in Table VI.

TABLE VI

| | Effect Of Elastomer Type On Blend Performance | | | | | | | | |
|---|---|---|---|---|---|---|---|---|---|
| | Run # | | | | | | | | |
| | 25 | 26 | 27 | 28 | 29 | 30 | 31 | 32 | 33 |
| | PARTS BY WEIGHT, GRAMS | | | | | | | | |
| APP, K-TAC 100B | — | — | — | — | 60.10 | 47.50 | 47.50 | 60.10 | 50.00 |
| APP, K-TAC 400 | 60.10 | 47.50 | 47.50 | 60.10 | — | — | — | — | — |
| Kraton D-1107 | 13.30 | — | — | — | — | — | — | — | — |
| Kraton D-1102 | — | 5.00 | — | — | — | — | — | — | — |
| Kraton G-1650 | — | — | 5.00 | — | — | — | — | — | — |
| Kraton G-1652 | — | — | — | 13.30 | 6.65 | 5.00 | — | — | — |
| Kraton GX-1657 | — | — | — | — | 6.65 | — | — | — | — |
| Kraton GX-1726 | — | — | — | — | — | — | 5.00 | 13.30 | — |
| Kraton G-1701 | — | — | — | — | — | — | — | — | 15.00 |
| Escorez 5380 | 26.60 | 47.50 | 47.50 | 26.60 | 26.60 | 47.50 | 47.50 | 26.60 | 35.00 |
| Isonox 129/DLTDP (1:1) | 0.60 | 0.60 | 0.60 | 0.60 | 0.60 | 0.60 | 0.60 | 0.60 | 0.60 |
| Total | 100.6 | 100.6 | 100.6 | 100.6 | 100.6 | 100.6 | 100.6 | 100.6 | 100.6 |
| Properties | | | | | | | | | |
| Viscosity, cps @ 350° F. | 11250 | 4150 | 7625 | 34000 | 7500 | 1450 | 950 | 4500 | 26500 |
| R & B, °C. | 153 | 150 | 153 | 157 | 153 | 144 | 150 | 152 | 151 |
| Performance | | | | | | | | | |
| Peel Strength, g/in., 50 mm/min. | | | | | | | | | |
| HDPE (4 mil)/HDPE (4 mil) | 1134 | 4876 | 5440 | 5217 | 5330 | 4083 | 4355 | 2540 | 1725 |
| Mylar (3 mil)/PP (120 mil) | 340 | No Ad | 10206 | 6124 | 5443 | 6714 | 6079 | 3448 | 2590 |

The data in Table VI exemplify the critical need of combining the amorphous polypropylene and tackifier with a selectively hydrogenated alkenyl arene/conjugated diene block copolymer to obtain an adhesive having improved adhesivity to HDPE and PP surfaces. In each of Runs Nos. 25 and 26, wherein the midblock isoprene and butadiene polymers were not hydrogenated, poor results were obtained. However, in each of Runs Nos. 27 to 33, wherein various types of selectively hydrogenated elastomers of varying midblock characteristics, styrene levels and molecular weights were used, excellent adhesivities were obtained.

A further series of runs was made and the data obtained are set forth below in Table VII.

TABLE VII

| | Influence Of APP Type on Blend Performance | | | | | | | |
|---|---|---|---|---|---|---|---|---|
| | Run # | | | | | | | |
| | 34 | 35 | 36 | 37 | 38 | 39 | 40 | 41 |
| | PARTS BY WEIGHT, GRAMS | | | | | | | |
| APP, K-Tac 100 | 47.50 | — | — | — | 60.10 | — | — | — |
| APP, K-Tac 100 A | — | 47.50 | — | — | — | 60.10 | — | — |
| APP, K-Tac 100D | — | — | 47.50 | — | — | — | 60.10 | — |
| APP, K-Tac 400 | — | — | — | 47.50 | — | — | — | 60.10 |
| Kraton GX-1657 | 5.00 | 5.00 | 5.00 | 5.00 | 13.30 | 13.30 | 13.30 | 13.30 |
| Escorez 5380 | 47.50 | 47.50 | 47.50 | 47.50 | 26.60 | 26.60 | 26.60 | 26.60 |
| Isonox 129/DLTDP (1:1) | 0.60 | 0.60 | 0.60 | 0.60 | 0.60 | 0.60 | 0.60 | 0.60 |
| Total | 100.6 | 100.6 | 100.6 | 100.6 | 100.6 | 100.6 | 100.6 | 100.6 |

TABLE VII-continued

Influence Of APP Type on Blend Performance

| | Run # | | | | | | | |
|---|---|---|---|---|---|---|---|---|
| | 34 | 35 | 36 | 37 | 38 | 39 | 40 | 41 |
| Properties | | | | | | | | |
| Viscosity, cps @ 350° F. | 600 | 1150 | 2525 | 5550 | 3000 | 5000 | 9875 | 24250 |
| R & B, °C. | 143 | 140 | 146 | 152 | 135 | 148 | 152 | 157 |
| Performance | | | | | | | | |
| Peel Strength, g/in., 50 mm/min. | | | | | | | | |
| HDPE (4 mil)/HDPE (4 mil) | 5900 | 5680 | 5680 | 5444 | 4540 | 5220 | 5450 | 4430 |
| Mylar (3 mil)/PP (120 mil) | 6810 | 7720 | 8170 | 11386 | 4990 | 4990 | 5220 | 6360 |

Runs Nos. 34 to 41 in Table VII show that excellent results are obtained herein using amorphous polypropylenes over a wide molecular weight range, that is, viscosity, while varying the amounts of the components used.

An additional series of runs was made. The data obtained are set forth below in Table VIII.

TABLE VIII

Influence Of Amorphous Polyalphaolefin Type On Blend Performance

| | Run # | | | | | | | | |
|---|---|---|---|---|---|---|---|---|---|
| | 42 | 43 | 44 | 45 | 46 | 47 | 48 | 49 | 50 |
| | PARTS BY WEIGHT, GRAMS | | | | | | | | |
| Vestoplast 508 | 47.50 | — | — | — | — | — | — | — | 47.50 |
| Vestoplast 703 | — | 47.50 | — | — | — | — | — | — | — |
| Vestoplast 608 | — | — | 47.50 | — | — | — | — | — | — |
| Vestoplast V3643 | — | — | — | 47.50 | — | — | — | — | — |
| Eastobond M-5H | — | — | — | — | 47.50 | — | — | — | — |
| Eastobond M-5C | — | — | — | — | — | 47.50 | — | — | — |
| Rextac B3B15 | — | — | — | — | — | — | 47.50 | — | — |
| Rextac B6B35 | — | — | — | — | — | — | — | 47.50 | — |
| Kraton G 1657 | 5.00 | 5.00 | 5.00 | 5.00 | 5.00 | 5.00 | 5.00 | 5.00 | 5.00 |
| Escorez 5380 | 47.50 | 47.50 | 47.50 | 47.50 | 47.50 | 47.50 | 47.50 | 47.50 | — |
| Regalrez 1094 | — | — | — | — | — | — | — | — | 47.50 |
| Isonox 129/DLTDP (1:1) | 0.60 | 0.60 | 0.60 | 0.60 | 0.60 | 0.60 | 0.60 | 0.60 | 0.60 |
| Total | 100.6 | 100.6 | 100.6 | 100.6 | 100.6 | 100.6 | 100.6 | 100.6 | 100.6 |
| Properties | | | | | | | | | |
| Viscosity, cps @ 350° F. | 4300 | 2050 | 4850 | 4050 | 2150 | 2750 | 1650 | 2850 | 3900 |
| R & B, °C. | 95 | 63 | 145 | 109 | 142 | 98 | 132 | 116 | 84 |
| Performance | | | | | | | | | |
| Peel Strength, g/in., 50 mm/min. | | | | | | | | | |
| HDPE (4 mil)/HDPE (4 mil) | 4808 | 5715 | 4568 | 5262 | 5720 | 6360 | 4900 | 3630 | 6670 |
| Mylar (3 mil)/PP (120 mil) | 7893 | 11680 | 8392 | 9072 | 8400 | 7720 | 7945 | 4540 | 11800 |

Runs Nos. 42 to 50 in Table VIII show that excellent results are obtained when the adhesive herein is prepared using various amorphous polyalphaolefins obtained from the polymerization of propylene with various other alpha olefins in place of amorphous polypropylene.

Obviously, many modifications and variations of the invention, as hereinabove set forth, can be made without departing from the spirit and scope thereof and therefore only such limitations should be imposed as are indicated in the appended claims.

We claim:

1. A melt adhesive composition especially useful in adhering polyolefin bodies to themselves, to other polyolefin bodies and to other non-polyolefinic bodies consisting of (A) from about 60 to 100 weight percent of a mixture consisting of an amorphous polypropylene, a block copolymer selected from the group consisting of styrene-ethylene/butene-1 block copolymers and styrene-ethylene/propylene block copolymers and a hydrocarbon tackifier, wherein said amorphous polypropylene has a crystallinity of less than about 10 weight percent and a molecular weight in the range of about 300 to about 50,000 and said hydrocarbon tackifier has a ring and ball softening point in the range of about 10° to about 150° C.; the above components being present in the following relative amounts:

| | Weight Percent |
|---|---|
| Amorphous Polypropylene | 5-95 |
| Block Copolymer | 2.5-40 |
| Hydrocarbon Tackifier | 2.5-55 |

(B) from about 0 to about five weight percent, based on the weight of the final adhesive composition of an antioxidant and (C) from about 0 to about 40 weight percent, based on the weight of the final adhesive composition of a compound or a mixture of compounds selected from the group consisting of an isotactic polypropylene, ethylene-propylene copolymers, paraffin and microcrystalline waxes, Fischer-Tropsch waxes, low molecular weight polybutenes, polyisobutylene, low molecular weight polyethylene, low density polyethylene and process oils.

2. The melt adhesive composition of claim 1 wherein said amorphous polypropylene is obtained as a by-product during the production of crystalline polypropylene.

3. The melt adhesive composition of claim 1 wherein said amorphous polypropylene is obtained as a direct product of the polymerization of propylene without the formation of crystalline polypropylene.

4. The melt adhesive composition of claim 1 wherein said amorphous polypropylene has a crystallinity of less than about five weight percent and a molecular weight in the range of about 1000 to about 25,000.

5. The melt adhesive of claim 1 wherein the total average molecular weight range of the styrene portion of said block copolymer is in the range of about 2000 to about 125,000.

6. The melt adhesive of claim 1 wherein the total average molecular weight range of the styrene portion of said block copolymer is in the range of about 5000 to about 50,000.

7. The melt adhesive of claim 1 wherein the average molecular weight range of the ethylene/butene-1 and ethylene/propylene blocks is in the range of about 10,000 to about 500,000.

8. The melt adhesive of claim 1 wherein the average molecular weight range of the ethylene/butene-1 and ethylene/propylene blocks is in the range of about 20,000 to about 300,000.

9. The melt adhesive of claim 1 wherein the total weight of the styrene portion of said block copolymer is in the range of about five to about 50 weight percent.

10. The melt adhesive of claim 1 wherein the total weight of the styrene portion of said block copolymer is in the range of about 10 to about 35 weight percent.

11. The melt adhesive of claim 1 wherein the (A) components are present in the following relative amounts:

|  | Weight Percent |
|---|---|
| Amorphous polypropylene | 30–90 |
| Block Copolymer | 5–20 |
| Hydrocarbon Tackifier | 5–50 |

12. The melt adhesive of claim 1 wherein said styrene blocks are composed of styrene.

13. The melt adhesive of claim 1 wherein said styrene blocks are composed of alpha methyl styrene.

14. The melt adhesive of claim 1 wherein said styrene blocks are composed of a ring substituted styrene.

15. The melt adhesive of claim 1 wherein said styrene blocks are composed of a ring alkylated styrene.

16. The melt adhesive of claim 1 wherein said composition consists of said amorphous polypropylene, a styrene-ethylene/butene-1 block copolymer and said tackifier.

17. The melt adhesive of claim 1 wherein said composition consists of said amorphous polypropylene, a styrene-ethylene/propylene block copolymer and said tackifier.

18. The melt adhesive composition of claim 1 wherein said hydrocarbon tackifier has a ring and ball softening point in the range of about 25° to about 125 C.

* * * * *

UNITED STATES PATENT AND TRADEMARK OFFICE
CERTIFICATE OF CORRECTION

PATENT NO. : 4,857,594

DATED : August 15, 1989

INVENTOR(S) : Pallavoor R. Lakshmanan and Son I. Nguyen

It is certified that error appears in the above-identified patent and that said Letters Patent is hereby corrected as shown below:

Column 3, line 65, after "poly(alphamethyl)styrene-hydrogenated" insert "polybutadiene-poly(alphamethyl)styrene,"

Column 3, line 66, after "poly(alphamethyl)styrene-hydrogenated" insert "polyisoprene-poly(alphamethyl)styrene,"

Column 4, line 6, after "A", but before "segments," insert "represents polystyrene or poly(alphamethyl)styrene"

Column 5, line 68, cancel "millimeters" and insert "milliliters" in lieu thereof.

Column 16, line 27, insert the designation "°" after "125".

Signed and Sealed this

Tenth Day of December, 1991

Attest:

HARRY F. MANBECK, JR.

*Attesting Officer*  *Commissioner of Patents and Trademarks*